(12) United States Patent
Gadkaree

(10) Patent No.: US 6,555,032 B2
(45) Date of Patent: Apr. 29, 2003

(54) METHOD OF MAKING SILICON NITRIDE-SILICON CARBIDE COMPOSITE FILTERS

(75) Inventor: Kishor P. Gadkaree, Big Flats, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 10/188,597

(22) Filed: Jul. 2, 2002

(65) Prior Publication Data

US 2003/0047829 A1 Mar. 13, 2003

Related U.S. Application Data

(60) Provisional application No. 60/315,766, filed on Aug. 29, 2001.

(51) Int. Cl.$^7$ ............................................. C01B 31/00
(52) U.S. Cl. ...................................... 264/29.7; 264/44
(58) Field of Search ........................ 264/44, 29.1, 29.7, 264/630

(56) References Cited

U.S. PATENT DOCUMENTS

| | | | |
|---|---|---|---|
| 4,629,707 A | | 12/1986 | Wolfe |
| 5,316,987 A | * | 5/1994 | Yasutomi et al. |
| 5,364,608 A | * | 11/1994 | Edler |
| 5,935,888 A | | 8/1999 | Toriyama et al. |
| 2001/0036531 A1 | | 11/2001 | Sinohara et al. |

FOREIGN PATENT DOCUMENTS

| | | |
|---|---|---|
| GB | 2 105 316 | 3/1982 |
| JP | 3-223166 | 10/1991 |
| JP | 10-81568 | 3/1998 |
| WO | 01/47833 | 7/2001 |

* cited by examiner

Primary Examiner—Christopher A. Fiorilla
(74) Attorney, Agent, or Firm—Anca C. Gheorghiu; Adenike A. Adewuya

(57) ABSTRACT

A process for forming a porous silicon nitride-silicon carbide body, the process comprising (a) forming a plasticizable batch mixture comprising (1) powdered silicon metal; (2) a silicon-containing source selected from the group consisting of silicon carbide, silicon nitride and mixtures thereof; (3) a water soluble crosslinking thermoset resin having a viscosity of about 50–300 centipoise; and, (4) a water soluble thermoplastic temporary binder; (b) shaping the plasticizable batch mixture to form a green body; (c) drying the green body; (d) firing the green body in nitrogen at a temperature of 1400° C. to 1600° C. for a time sufficient to obtain a silicon nitride-silicon carbide structure.

8 Claims, No Drawings

METHOD OF MAKING SILICON NITRIDE-SILICON CARBIDE COMPOSITE FILTERS

This application claims the benefit of U.S. Provisional Application No. 60/315,766 filed Aug. 29, 2001, entitled "Method of Making Silicon Nitride-Silicon Carbide Composition Filters", by K. Gadkaree.

BACKGROUND OF THE INVENTION

The present invention relates to a method of making silicon nitride-bonded silicon carbide honeycomb bodies useful in the removal of diesel soot particles from the exhaust gas of diesel engines.

Filters of diesel exhaust streams require a combination of high thermal shock resistance, chemical and mechanical durability in harsh environments, and good filtration efficiency.

Silicon nitride-bonded silicon carbide is known for being highly refractory material and therefore would be suitable in applications for the treatment of diesel exhaust, such as diesel particulate filters. In general, the method for forming such composite material is via the formation of a green body from of mixture of powdered silicon carbide and powdered silicon nitride, the green body being thereafter sintered. The drawback of this process is a non-uniform microstructure in the final product. In diesel filtration applications such a non-uniform microstructure could harbor local stresses which may lead to thermal cracking and failure during use.

There is, accordingly a clear need for, and thus an object of the present invention to provide for a process for making silicon nitride-silicon carbide composite material for diesel exhaust filtration applications.

SUMMARY OF THE INVENTION

Accordingly, the object of the present invention is directed at a plasticizable raw material batch mixture for forming a silicon nitride-silicon carbide honeycomb structure for diesel exhaust filtration, comprising the following components: (1) powdered silicon metal; (2) a silicon-containing source selected from the group consisting of silicon carbide, silicon nitride and mixtures thereof; (3) a water soluble crosslinking thermoset resin having a viscosity of about 50–300 centipoise (cp); and, (4) a water soluble thermoplastic temporary binder. Optionally, the batch mixture can include a pore forming filler comprising either a graphitic or a thermoplastic pore-forming filler, such as polyethylene beads. The silicon nitride-forming source can include silicon metal and The inventive process further involves the following steps: (1) mixing together selected raw materials to form the previously mentioned plasticizable raw material batch; (2) shaping the batch mixture to form a shaped green body, preferably involving extrusion to form a honeycomb structure; (3) drying and curing the green body; (4) firing the green body in nitrogen at a temperature sufficient to convert the green body to a porous silicon nitride-silicon carbide sintered body; preferably a temperature of about 1400–1600° C.

DETAILED DESCRIPTION OF THE INVENTION

The present invention relates to a method of making silicon nitride-silicon carbide honeycomb bodies which possess good mechanical strength, uniform pore structure and desirable properties especially for diesel particulate filtering applications.

The extrudable batch mixture for use in preparing a silicon nitride-silicon carbide honeycomb substrate includes powdered silicon metal, a silicon-containing source selected from the group consisting of silicon carbide, silicon nitride and mixtures thereof and a thermoset resin.

Advantageously the batch may include about 20–50%, by weight, powdered silicon metal; preferably about 35%; (b) about 10–35%, by weight, powdered silicon nitride; preferably, about 15–30%; and (c) about 10–25%, by weight powdered silicon carbide. The silicon metal should exhibit a small mean particle size of about 10 to 20 micrometers, preferably about 15 micrometers. The mean particle size of the silicon nitride powder should be about 5 to 40 micrometers, preferably about 10 micrometers. The mean particle size of the silicon carbide powder should be about 5 to 20 micrometers.

It is preferred that the silicon powder be comprised of a crystalline silicon powder. It has been found that the use of amorphous silicon metal powder in the subsequent formation process results in an aqueous system that typically is subject to a reaction, and resultant foaming, between the silicon and water which is used as the preferred solvent for the thermoset resin batch component as discussed below. This foaming is particularly undesirable when forming honeycomb, or similar-type filtration structures, as it makes it particularly difficult to form structures exhibiting controlled wall uniformity, porosity and microstructure; i.e., difficulty in forming ceramic bodies exhibiting the narrowed pore size distribution desired for filtration applications.

The raw batch also contains about 5–30%, by weight, of a thermoset resin, specifically a water soluble crosslinking thermoset resin. Acceptable water-soluble crosslinking thermoset resins include phenolic resins, such as Phenolic resole liquid resin available from Georgia Pacific commercially sold as code GP510D34 RESI-SET.

Viscosity is an important feature of the thermoset resin utilized in the raw batch. It has been discovered that resin systems, in addition to being water-soluble must have a viscosity of about 50–300 centipoise (cp). Viscosities at these low levels allow the plasticized batch mixture to be extrudable in a variety of shapes, specifically honeycombs. Use of a thermoset resin of higher viscosities results in extruded structures, such as honeycombs, that have a tendency to exhibit split walls, in spite of attempts to avoid this undesirable split wall feature by adding water to reduce the viscosity of the resin. Although not intending to be limited by theory, it is thought that the reason for this behavior is as follows. Phenolic resins are produced by a reaction of phenol and formaldehyde in a water solution while in the presence of an acid or base catalyst. As the reaction proceeds, oligomers are formed and the resin begins to precipitate. The longer the reaction is allowed to continue, the higher the oligomer molecular weight. Higher molecular weight oligomers have fewer reactive sites and lower water solubility. The viscosity of the resin thus indicates its oligomer reactivity and water solubility. Once the viscosity becomes very high, the resin completely precipitates out of the water. For a given process the viscosity of the phenolic resin is thus very critical, since it will determine the reactivity of the resin with components, it's capability to be diluted and still form strong structure on cure, as well as carbonization tendency. In this particular case where phenolic resin-containing honeycomb structures with fillers are preferably extruded, it is necessary to have the resin viscosity between 50–300 cp. One advantage of utilizing the liquid thermoset resin in the batch mixture is that it intimately mixes with silicon powder to ultimately form a homogeneously and intimately mixed structure.

About 5–10%, by weight of a water-soluble thermoplastic temporary binder is added to the mixture to obtain a good extrudate. Acceptable temporary binders include methylcellulose, hydroxypropyl methylcellulose, and combinations thereof. Preferred sources of cellulose ethers and/or derivatives thereof, are Methocel A4M, F4M, and F240M from Dow Chemical Co. Methocel A4M is a methylcellulose binder having a gel temperature of 50–55° C. and gel strength of 5000 g/cm$^2$ (based on 2% solution at 65° C.). Methocel F4M and F240M are hydroxypropyl methylcellulose.

Optionally, the batch may include a pore-forming filler in an amount of up to 20%, by weight, specifically an organic filler, which does not leave any carbon residue after firing; suitable pore-formed fillers include either a graphitic or thermoplastic pore-forming filler. Pore size and porosity amounts are important properties that must be controlled when forming a honeycomb structure for use in filtration applications. For applications such as diesel particulate filtration, for example, desired pore sizes range from 3–30 microns. If a graphitic pore-forming filler is utilized in the batch mixture, the mean particle size and weight percent of graphite powder utilized determines the final porosity in the wall. It should be noted that the graphitic filler is not affected in any way during later-described cure, carbonization or reactive firing/sintering of the honeycomb structures. As such, any so-formed structure will require a post-sintering step to burn out graphite and leave porosity behind; e.g., the honeycombs can subjected to air firing at around 800° C. to burn out graphite. On the other hand, the use of a thermoplastic pore-forming filler will not require a post-sintering burn-out step as the filler burns out in nitrogen during the later-described carbonization with little or no carbon residue while still leaving behind the requisite porosity.

The mixing preferably takes place in three stages. In the first stage, the silicon nitride and silicon carbide sources are mixed with the required amount of the water-soluble resin. The second stage or wetting stage of batch formation, involves adding and dry mixing together the resin mixture and the remaining powder particles, i.e., the binder and optional pore former, and thereafter adding the required amount of the solvent to form the wet batch. This mixing and solvent addition is done in a standard mixer, for example a Littleford mixer. The solvent, typically water, is added in an amount that is less than is needed to plasticize the batch; typically the water is added as a superaddition, in amounts ranging from 5–25%, by weight, with levels ranging from 7–15%, by weight being preferred. With water as the solvent, the water hydrates the binder and the powder particles. At this stage, the powder particles are coated and dispersed.

In a preferred embodiment, the plasticization takes place in the third stage. In this stage the wet mix from the second stage is sheared in any suitable mixer (e.g., Littleford) in which the batch will be plasticized. In other words, stirring together the powdered components, in a suitable known manner, to prepare an intimate mixture capable of being formed into a green body by, for example, by extrusion or molding.

Following plasticization, the resulting stiff, uniform and extrudable batch mixture is then shaped into a green body by any known conventional ceramic forming process, such as, e.g., extrusion, injection molding, slip casting, centrifugal casting, pressure casting, dry pressing, etc. For the preparation of a thin-walled honeycomb substrate suitable for use in diesel filtration applications, extrusion through a die is preferable.

Once the batch mixture is plasticized and thereafter shaped into, for example a honeycomb structure, the so-formed structure is then dried and cured by one of a variety of conventional techniques known to those skilled in the art, e.g., hot-air heating, microwave heating, and dielectric heating. Preferably, the green honeycomb structures are dried and cured for a period of 1 hour at temperatures of up between 90 to 150° C.

The green structures are then fired in nitrogen at temperatures of between 1400–1600° C. to carbonize the resin and to remove pore-forming fillers. The green structure should be fired for a sufficient period of time so as to complete the conversion to silicon nitride-silicon carbide porous honeycombs. The firing step can be carried out in a conventional batch or continuous furnace, wherein the shaped body is passed through the hot zone of the furnace at a rate to provide a prescribed residence time at the desired temperature.

EXAMPLES

To further illustrate the principles of the invention of the present invention, there will be described certain examples of silicon nitride-silicon carbide structures formed according to the invention. However, it is to be understood that the examples are given for illustrative purpose only, and the invention is not limited thereto, but various modifications and changes may be made in the invention, without departing from the spirit of the invention.

Example 1

A plasticizable raw material batch mixture containing the following raw materials was mixed and mulled together with a 13%, by weight, superaddition of water:

| Component | Weight Percent |
|---|---|
| Powdered crystalline silicon | 36.5 |
| Phenolic resole liquid resin | 17.5 |
| Silicon carbide powder | 15.0 |
| Silicon nitride powder | 15.0 |
| Polyethylene Beads | 8.0 |
| Methylcellulose binder | 7.0 |
| (Methocel A4M, Dow Chemical, Midland, MI) | |
| SAN Lubricant | 1.0 |
| (Proctor & Gamble, Cincinnati, OH) | 100.0 |

The mulled mixture was then extruded through a 200 cpsi die to obtain a honeycomb structure having a 2.5 cm diameter, with walls having a thickness of 0.015 in. The honeycomb shaped green structure was dried, and then fired in nitrogen at 1550° C. for 1 hour, and thereafter cooled to room temperature.

The resulting honeycomb structure had a microstructure comprising silicon nitride and silicon carbide, a modulus of rupture strength of 2700 pounds per square inch, a porosity of 56% and a pore size of 3.5 microns.

EXAMPLE 2

A plasticizable raw material batch mixture containing the following raw materials was mixed and mulled together with a 13%, by weight, superaddition of water:

| Component | Weight Percent |
| --- | --- |
| Powdered crystalline silicon | 36.5 |
| Phenolic resole liquid resin | 17.5 |
| Silicon nitride powder | 30.0 |
| Polyethylene Beads | 8.0 |
| Methylcellulose binder (Methocel A4M, Dow Chemical, Midland, MI) | 7.0 |
| SAN Lubricant | 1.0 |
| (Proctor & Gamble, Cincinnati, OH) | 100.0 |

The process of example 1 was followed to form a silicon nitride-silicon carbide honeycomb structure, except for the firing which was conducted at 1450° C. for 4 hours. As for example 1, the so-formed structure exhibited good strength and microstructure properties suitable for diesel particulate filtering applications. Specifically, the structure exhibited a modulus of rupture strength of 2900 pounds per square inch and a porosity of 59%.

It should be understood that while the present invention has been described in detail with respect to certain illustrative and specific embodiments thereof, it should not be considered limited to such, as numerous modifications are possible without departing from the broad spirit and scope of the present invention as defined in the appended claims.

It is claimed:

1. A process for forming a porous silicon nitride-silicon carbide body, the process comprising:
   (a) forming a plasticizable batch mixture comprising:
      (1) powdered silicon metal;
      (2) a silicon-containing source selected from the group consisting of silicon carbide, silicon nitride and mixtures thereof;
      (3) a water soluble crosslinking thermoset resin having a viscosity of about 50–300 centipoise; and,
      (4) a water soluble thermoplastic temporary binder;
   (b) shaping the plasticizable batch mixture to form a green body;
   (c) drying the green body;
   (d) firing the green body in nitrogen at a temperature of 1400° C. to 1600° C. for a time sufficient to obtain a silicon nitride-silicon carbide structure.

2. The process of claim 1 wherein the mixture further includes a pore former.

3. The process of claim 2 wherein the pore former is selected from the group consisting of graphite and polyethylene beads.

4. The process of claim 1 wherein the mixture comprises:
   (1) 20–50%, by weight, powdered silicon metal;
   (2) 10–35%, by weight, powdered silicon nitride;
   (3) 5–30%, by weight, water soluble crosslinking thermoset resin; and,
   (4) 5–10%, by weight, water soluble temporary binder.

5. The process of claim 4 wherein the mixture further includes 10–25%, by weight powdered silicon carbide.

6. The process of claim 1 wherein the thermoset resin is phenolic resin.

7. The process of claim 1 wherein the shaping step involves extrusion through a honeycomb extrusion die to form a honeycomb green body.

8. The process of claim 1 wherein the water soluble thermoplastic temporary binder is methylcellulose.

* * * * *